(12) United States Patent
Kao et al.

(10) Patent No.: US 10,933,476 B1
(45) Date of Patent: Mar. 2, 2021

(54) FIXED-TYPE ROTARY CUTTER

(71) Applicants: Chin-Fa Kao, Lukang Township, Changhua County (TW); Yao-Hsien Hsu, Lukang Township, Changhua County (TW); Huang-Ming Hsu, Lukang Township, Changhua County (TW)

(72) Inventors: Chin-Fa Kao, Lukang Township, Changhua County (TW); Yao-Hsien Hsu, Lukang Township, Changhua County (TW); Huang-Ming Hsu, Lukang Township, Changhua County (TW)

( * ) Notice: Subject to any disclaimer, the term of this patent is extended or adjusted under 35 U.S.C. 154(b) by 0 days.

(21) Appl. No.: 16/779,983

(22) Filed: Feb. 3, 2020

(30) Foreign Application Priority Data

Sep. 19, 2019 (TW) .................................. 108133830

(51) Int. Cl.
*B23B 51/04* (2006.01)

(52) U.S. Cl.
CPC .......... *B23B 51/04* (2013.01); *B23B 51/0426* (2013.01); *Y10T 408/8957* (2015.01)

(58) Field of Classification Search
CPC ........................... B23B 51/0426; B23B 51/04; Y10T 408/8957
See application file for complete search history.

(56) References Cited

U.S. PATENT DOCUMENTS

| 2,551,778 | A | * | 5/1951 | Wilson | B23B 51/05 408/190 |
| 2,628,512 | A | * | 2/1953 | Lankford | B23B 51/05 408/79 |
| 6,341,925 | B1 | * | 1/2002 | Despres | B23B 51/0453 408/204 |
| 6,457,915 | B1 | * | 10/2002 | Kao | B23B 51/05 408/204 |
| 6,857,831 | B2 | * | 2/2005 | Davis | B23B 51/0433 408/204 |
| 7,104,738 | B2 | * | 9/2006 | Cantlon | B23B 51/0473 279/14 |
| 7,384,222 | B2 | * | 6/2008 | Chao | B23B 31/1075 408/204 |
| 7,766,583 | B2 | * | 8/2010 | Kozak | B23B 51/0473 408/1 R |
| 8,366,356 | B2 | * | 2/2013 | Novak | B23B 51/0473 408/204 |
| 8,840,344 | B2 | * | 9/2014 | Stenman | B28D 1/041 408/67 |
| 9,597,736 | B2 | * | 3/2017 | Steele | B23B 51/05 |
| 9,925,600 | B2 | * | 3/2018 | Hsu | B23B 51/0054 |
| D851,145 | S | * | 6/2019 | Davis | D15/139 |

(Continued)

*Primary Examiner* — Eric A. Gates
(74) *Attorney, Agent, or Firm* — Egbert Law Offices, PLLC

(57) ABSTRACT

A rotary cutting unit for a rotary saw has a cross bar and at least one cutting structure, wherein the cutting structure is in contact with the cross bar. The cross bar runs through sleeve holes. The center of gravity of the turning unit is located in an axis of the center of the sleeve holes. The axis is perpendicular to the transverse axis of the crossbar. The rotary saw selectively installs the rotary cutting unit of the corresponding specification, and it can quickly and easily change the aperture of the circular hole to be processed, and with high usability.

4 Claims, 4 Drawing Sheets

(56) References Cited

U.S. PATENT DOCUMENTS

2009/0214310 A1* 8/2009 Chao ................... B23B 51/0473
408/204
2012/0183366 A1* 7/2012 Stenman ............ B23Q 11/0071
408/1 BD

* cited by examiner

FIXED-TYPE ROTARY CUTTER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a rotary hole saw device, and more particularly to an innovative fixed-type rotary cutter.

2. Description of Related Art Including Information Disclosed Under 37 CFR 1.97 and 37 CFR 1.98

The commercially available rotary hole saw is used for drilling circular holes in plates of wood or metal building materials, e.g. drilling the mounting hole for a flaring lock in a door sheet, or drilling the mounting hole for a lamp holder in the ceiling.

There are two kinds of rotary hole saws on the market. One is the hole saw. The hole saw comprises a base, an auger core and a circular saw blade. The auger core is located in the bottom of the base, and the circular saw blade is installed in the preset position of the base, so as to form a fixed pattern. The other one is the scale rod type. The scale rod type comprises a base, a scale rod, an auger core and a cutter blade. The auger core is located in the bottom of the base, and the scale rod laterally penetrates the preset position of the base, it is positioned by screw locking on the fixing component of base, and the scale rod has graduations. The two ends of scale rod fix the cutter blade, so as to form a fixed pattern. In addition, the movable block can be mounted on both ends of scale rod, and the cutter blade is mounted in the bottom of the movable block, so as to form an adjustable pattern.

However, the known structure still has the following problems and defects in practice. For example, in terms of the fixed pattern, one single size was mostly used in the past, there were so many sizes of circular hole to be drilled, so multiple sets of circular saw blade or scale rod should be prepared, and then the operators configured correct circular saw blade or scale rod size according to the design size on site, the operators had to carry a lot of heavy tools with them. Therefore, the adjustable rotary hole saw was designed. The adjustable rotary hole saw has graduations on the scale rod, and the operator adjusts the blade distance on the scale rod according to the size in the design drawings when drilling a circular hole. However, the operator has to adjust the size accurately to avoid errors, and after times of adjustment, the wear may result in incorrect positioning. To sum up, the construction time will be too long or the drilling will fail.

Thus, to overcome the aforementioned problems of the prior art, it would be an advancement in the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The primary object of the present invention is to provide a fixed-type rotary cutter, the technical problem to be solved is to break through how to develop a new type of fixed-type rotary cutter with more ideal practicability.

Based on the aforementioned object, the present invention provides a fixed-type rotary cutter, which comprises a screw module, provided with a base and a screw along the axis, the base has a basal portion and a connecting portion located in the lower end of basal portion, wherein the connecting portion is to be connected to a power tool, the screw has an assembling end, an insertion end and a stem between assembling end and insertion end; a fixed-type rotary cutter module, which comprises a cross bar and two fixed cutters, wherein the cross bar is provided with a central axial hole, the central axial hole axially penetrates the center point of cross bar, a compression face is formed around the central axial hole, the two fixed cutters are fixed to both ends of cross bar respectively, so that the saw cutting points of two fixed cutters are equidistant from the center point of central axial hole, the stem of screw is telescoped into the central axial hole; a driving and locking module, which comprises a driving holder and a locking holder, the driving holder is integrated with the upper end of basal portion, the driving holder comprises a clamping slot and an axial hole, wherein the clamping slot defines an opening end and two driving walls, the opening end is oriented far from the connecting portion, the axial hole is located in one end of driving holder and interconnected to the clamping slot, the axial hole is provided for assembling the insertion end, so that the opening end is oriented far from the connecting portion. The locking holder is a detachable component, provided with a screw insertion portion, an auger core insertion portion, a fixing hole and an assembly/disassembly portion on the external surface, wherein the screw insertion portion is screwed on the assembling end, the auger core insertion portion is positioned by auger core insertion, the fixing hole fixes the auger core by screw locking, the assembly/disassembly portion is assembled or disassembled by a tool; the cross bar of the fixed-type rotary cutter module is fitted over the stem of screw. The cross bar of the fixed rotary module is embedded in the clamping slot of the driving holder, so that the two driving walls clamp and drive the corresponding stem of cross bar. The locking holder has a pressing face on the outer end face of screw insertion portion, and it is screwed on the screw by screw insertion portion, so as to generate an axial locking action on the cross bar.

In terms of main effect and advantages of the present invention, the operators' construction time is shortened, and the hole can be drilled accurately at a high rate of success. A central axial hole is drilled in the central position of the cross bar of the fixed-type rotary cutter module, the fixed cutters of the fixed-type rotary cutter module are located at both ends of the cross bar respectively, so that the fixed cutters are limited to one size, eliminating the errors resulted from the accurate adjustment of size, the cutter replacement speed is increased greatly for the rotary hole saw, and practical progressiveness of drilling size precision and better industrial use benefit can be obtained.

DETAILED DESCRIPTION OF THE INVENTION

Further benefits and advantages of the present invention will become apparent after a careful reading of the detailed description with appropriate reference to the accompanying drawings.

Figure 1:
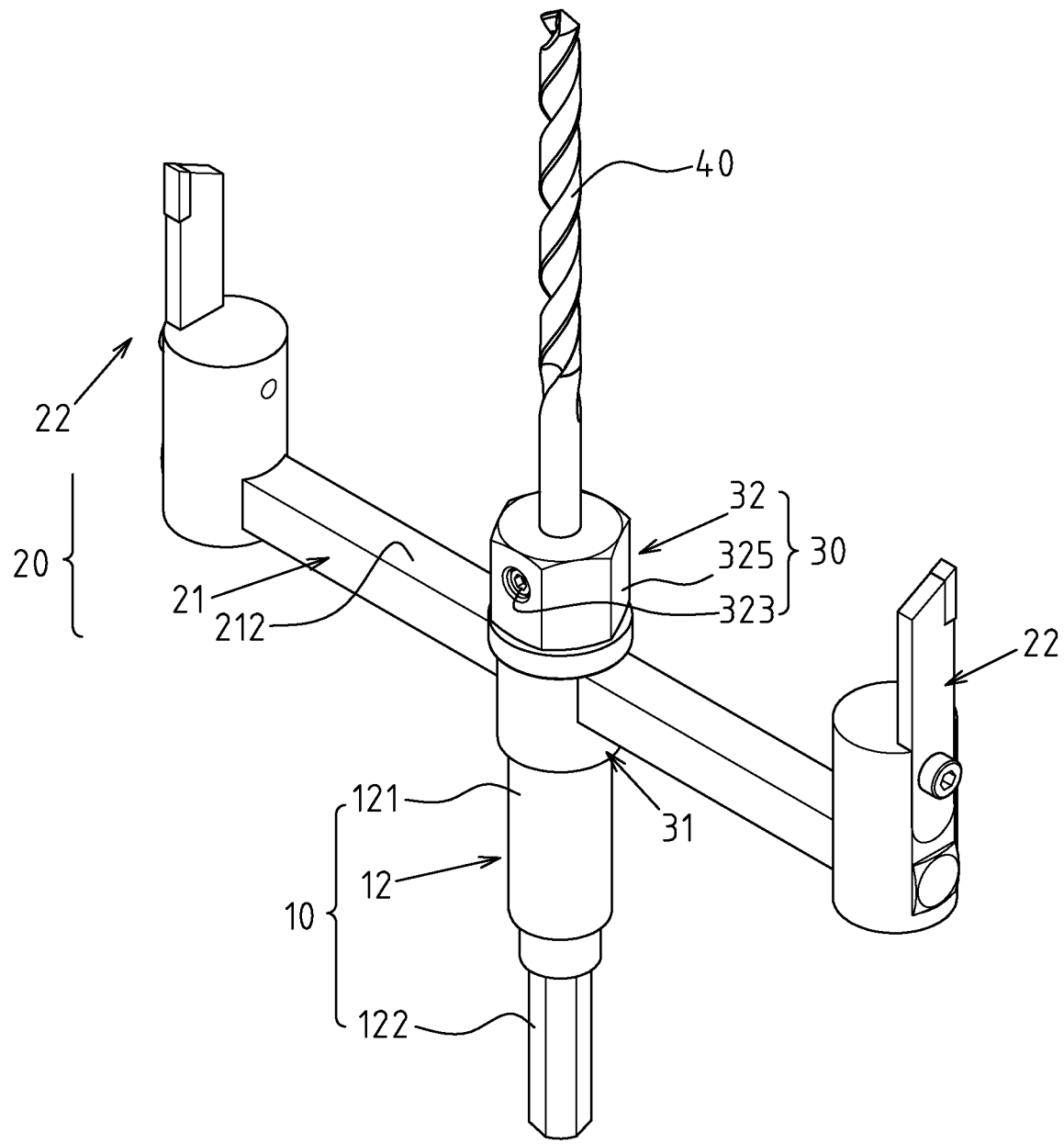
FIG. 1 is a combined stereogram of the preferred embodiment of the present invention.
Figure 2:
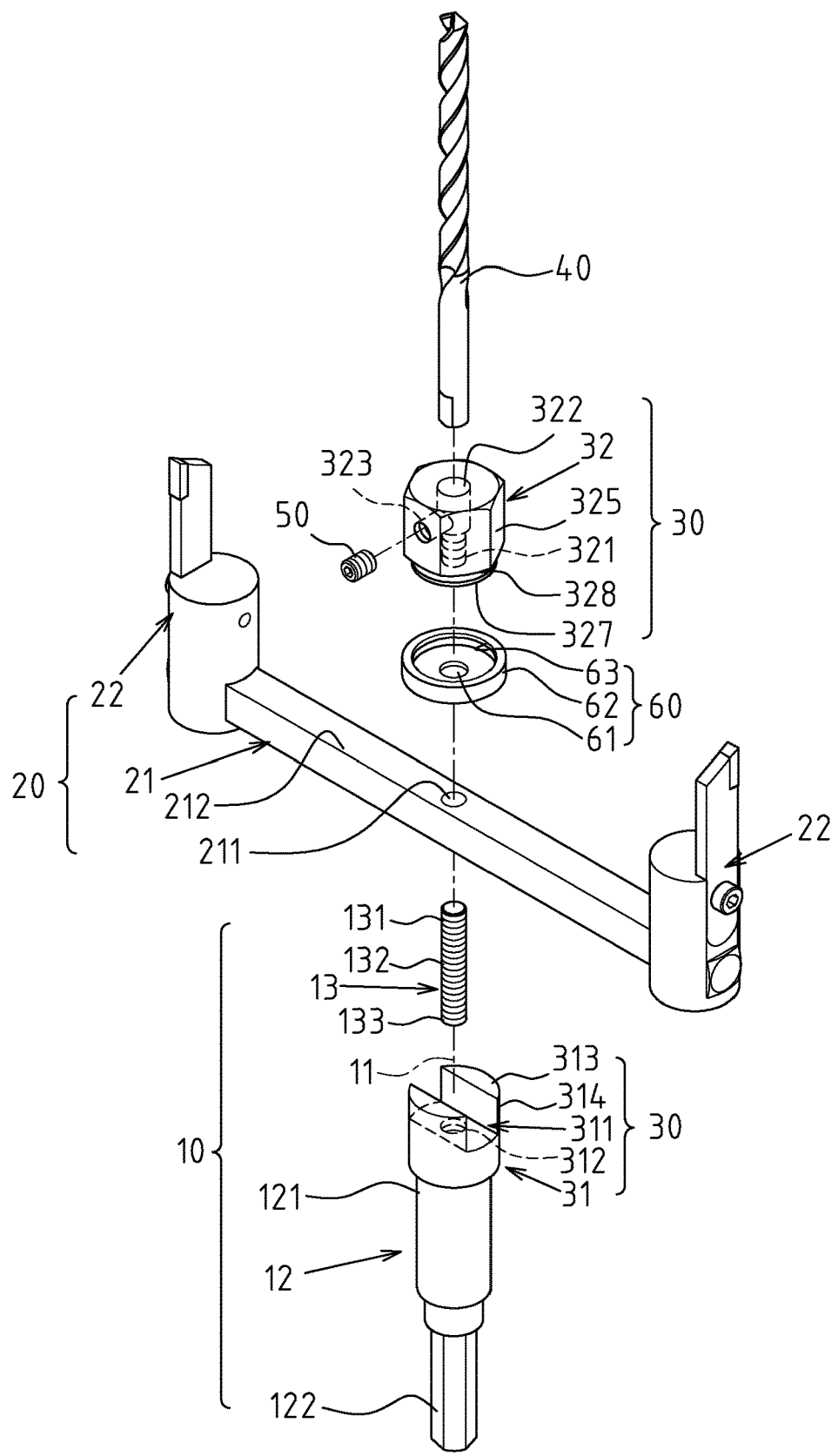
FIG. 2 is an exploded view of the preferred embodiment of this structure.
Figure 3:
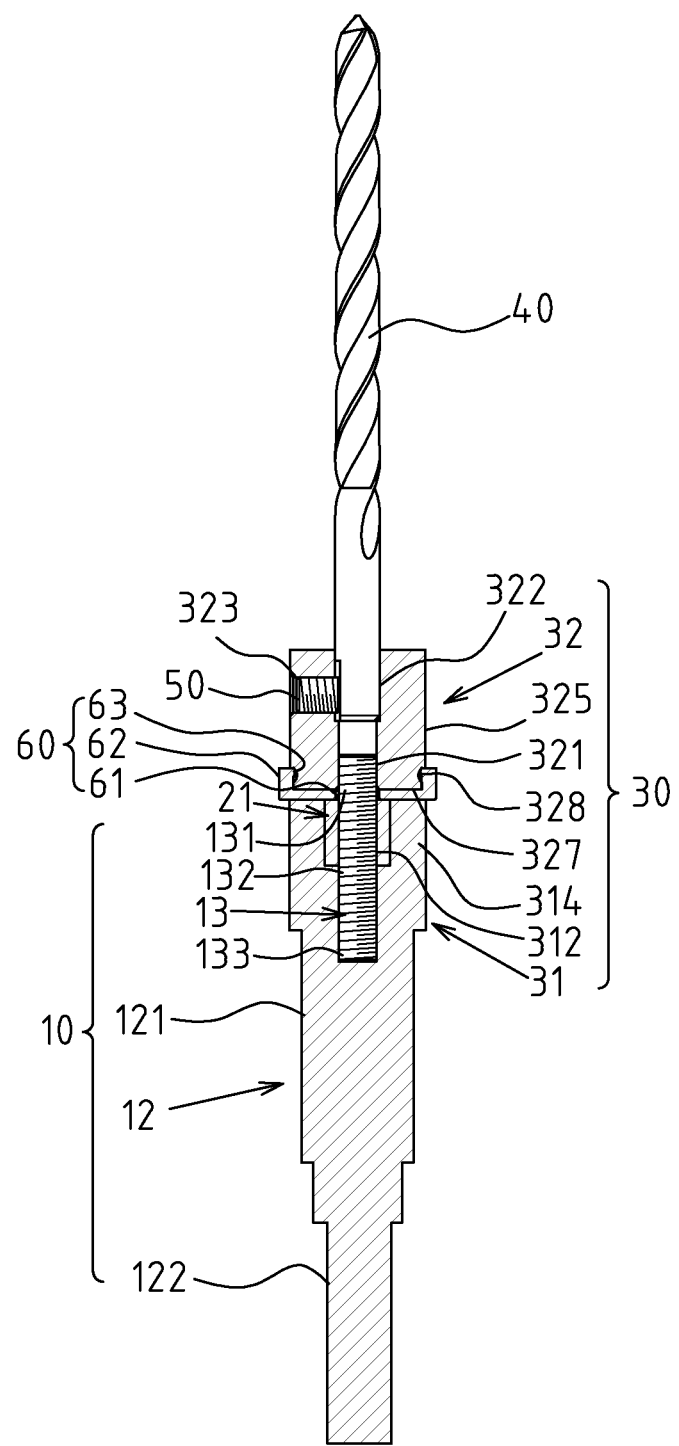
FIG. 3 is a sectional view of the preferred embodiment of the present invention.

As shown in FIG. 1-FIG. 3, the preferred embodiment of the fixed-type rotary cutter of the present invention comprises a screw module 10, provided with a base 12 and a screw 13 along an axis 11, the base 12 has a basal portion 121 and a connecting portion 122 in the lower end of the basal portion 121, wherein the connecting portion 122 is provided for connecting a power tool, the screw 13 has an assembling end 131, an insertion end 133 and a stem 132 between the assembling end 131 and insertion end 133; a fixed-type rotary cutter module 20, comprising a cross bar 21 and two fixed cutters 22, wherein the cross bar 21 is provided with a central axial hole 211, the central axial hole 211 penetrates the center point of the cross bar 21 along the axis 11, a compression face 212 is formed around the central axial hole 211, the two fixed cutters 22 are fixed to the two ends of the cross bar 21 respectively, and the saw cutting points of the two fixed cutters 22 are equidistant from the center point of the central axial hole 211, and the central axial hole 211 is fitted over the stem 132 of the screw 13; a driving and locking module 30, comprising a driving holder 31 and a locking holder 32, the driving holder 31 is integrated with the upper end of basal portion 121 of the base 12, the driving holder 31 comprises a clamping slot 311 and an axial hole 312, wherein the clamping slot 311 defines an opening end 313 and two driving walls 314, the opening end 313 is oriented far from the connecting portion 122, the axial hole 312 is located in one end of the driving holder 31 and interconnected to the clamping slot 311, and the axial hole 312 is provided for assembling the insertion end 133 of the screw 13, so that the opening end 313 of the clamping slot 311 is oriented far from the connecting portion 122. The locking holder 32 is a detachable component, provided with a screw insertion portion 321, an auger core insertion portion 322, a fixing hole 323 and an assembly/disassembly portion 325 on the external surface, wherein the screw insertion portion 321 is screwed on the assembling end 131 of the screw 13, the auger core insertion portion 322 is used to position an auger core 40, the fixing hole 323 fixes the auger core 40 by screw locking of a screw 50, the assembly/disassembly portion 325 is assembled or disassembled by a tool. Wherein the cross bar 21 of the fixed-type rotary cutter module 20 is fitted over the stem 132 of the screw 13, the cross bar 21 of the fixed-type rotary cutter module 20 is embedded in the clamping slot 311 of the driving holder 31, so that the two driving walls 314 clamp and drive the corresponding stem 132 of the cross bar 21. The locking holder 32 has a pressing face 327 on the outer end face of the screw insertion portion 321, and the screw insertion portion 321 is screwed on the screw 13, so as to generate an axial locking action on the cross bar 2L The pressing face 327 of the locking holder 32 is assembled by a spacer 60, the spacer 60 is thermoplastic (POM), and there is a hole 61 in the center. The hole 61 allows the screw 13 to go through. A circumferential wall 62 protrudes upward from the circumference of the spacer 60. There is a ring lug 63 in the circumferential wall. The ring lug 63 is stuck in the ring groove 328 of the assembly/disassembly portion 325. As stated above, the pressing face 327 of the locking holder 32 is assembled by the spacer 60, so that the pressing face 327 of the locking holder 32 is unlikely to slip off when pressing the compression face 212 formed around the central axial hole 211 of the cross bar 21.

Figure 4:
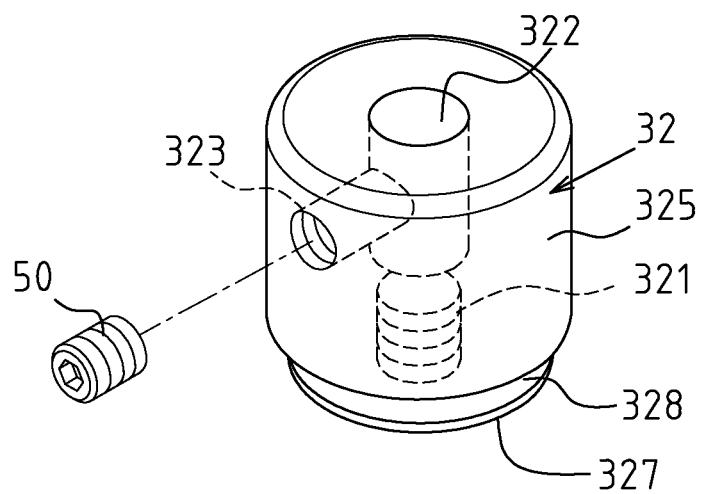
FIG. 4 shows the embodiment of a circular rod as the locking holder of the present invention.

A ring groove 328 is provided in the external surface of the assembly/disassembly portion 325. The ring groove 328 is a noncircular groove face. The assembly/disassembly portion 325 is a noncircular rod (as shown in FIGS. 1 to 3) or a circular rod (as shown in FIG. 4). As stated above, when the assembly/disassembly portion 325 is a circular rod, the assembly/disassembly portion 325 is provided with a ring groove 328 of noncircular groove face, the ring groove 328 can be disassembled or assembled by a tool (e.g. a spanner). When the assembly/disassembly portion 325 is a noncircular rod, the assembly/disassembly portion 325 can be disassembled or assembled by a tool (e.g. spanner, sleeve).

As shown in FIG. 1 and FIG. 3, the height of the cross bar 21 is equal to or larger than the height of the opening end 313 of the driving holder 31. As stated above, the pressing face 327 on the outer end face of the screw insertion portion 321 presses the compression face 212 formed around the central axial hole 211 of the cross bar 21, so that the cross bar 21 is unlikely to shake along the axis 11, and the stability of cross bar 21 is enhanced greatly.

We claim:

1. A rotary cutter comprising: a screw module having a base and a screw, the base having a basal portion and a connecting portion positioned in a lower end of the basal portion, wherein the connecting portion is adapted to connect to a power tool, the screw having an assembling end and an insertion end and a stem, the stem located between the assembling end and the insertion end; a rotary cutter module having a cross bar and a pair of fixed cutters, the cross bar having a central axial hole, the central axial hole extending through a center point of the cross bar, said rotary cutter module having a compression face formed around the central axial hole, wherein the pair of fixed cutters are respectively fixed to opposite ends of the cross bar, the pair of fixed cutters having respective saw cutting points equidistant from the center point of the cross bar, wherein the stem of said screw is received in the central axial hole; and a driving end locking module having a driving holder and a locking holder, the driving holder being integrated with an upper end of the basal portion of the base, the driving holder comprising a clamping slot and an axial hole, wherein the clamping slot defines an opening end and a pair of driving walls, the opening end being oriented away from the connecting portion, the axial hole being positioned in one end of the driving holder and interconnected to the clamping slot, the axial hole adapted to be assembled to the insertion end of said screw, wherein the locking holder is detachable and has a screw insertion portion and an auger core insertion portion and a fixing hole and an assembly/disassembly portion, wherein the screw insertion portion is screwed into the assembling end of said screw, the auger core insertion portion being used to position an auger core, wherein the fixing hole fixes the auger core by screw' locking, wherein the assembly/disassembly portion is adapted to be assembled or disassembled by a tool, the cross bar of the rotary cutter module being fitted over the stem of the screw, the cross bar being embedded in the clamping slot of the driving holder such that the pair of driving walls clamp and drive the stem of the cross bar, wherein the locking holder has a pressing face at an outer end face of the screw insertion portion, wherein the screws insertion portion is screwed on the stem so as to generate an axial locking action on the cross bar.

2. The rotary cutter of claim 1, wherein a ring groove is located at an external surface of the assembly/disassembly portion, the ring groove having a noncircular groove face.

3. The rotary cutter of claim 2, wherein the assembly/disassembly portion is a noncircular rod.

4. The rotary cutter of claim 2, wherein the assembly/disassembly portion is a circular rod.

* * * * *